No. 660,976.  
N. SWANSON.  
TIRE FOR BICYCLES.  
(Application filed Apr. 29, 1899.)  
Patented Oct. 30, 1900.

(No Model.)

WITNESSES  
Marcus F. Byng.  
Ralph L. Warfield

INVENTOR  
Nils Swanson  
by Rhesa G. DuBois & Co.  
his Attorneys

THE NORRIS PETERS CO., PHOTO-LITHO., WASHINGTON, D. C.

UNITED STATES PATENT OFFICE.

NILS SWANSON, OF OLEAN, NEW YORK.

TIRE FOR BICYCLES.

SPECIFICATION forming part of Letters Patent No. 660,976, dated October 30, 1900.

Application filed April 29, 1899. Serial No. 715,031. (No model.)

*To all whom it may concern:*

Be it known that I, NILS SWANSON, a citizen of the United States of America, residing at Olean, in the county of Cattaraugus and State of New York, have invented certain new and useful Improvements in Tires for Bicycles, of which the following is a specification.

My invention relates to an improvement in tires for bicycles or other vehicles employing pneumatic tires, the object being to provide a reinforcing or supplemental strip for attachment to the outer surfaces of vehicle-tires, which can be easily and quickly attached to a punctured or partly-worn tire to give it a new wearing-surface without necessitating the expense of an entirely new tire; and the invention consists in a reinforcing or supplemental strip of rubber adapted to be secured on a vehicle-tire, the outer surface of the strip made up of unbroken or continuous cross-channels of uniform depth and inclosed, independent, or disconnected square projections, whereby to prevent water and mud from being carried around on the wheel-surface when the wheel turns at a moderate speed.

Figure 1:
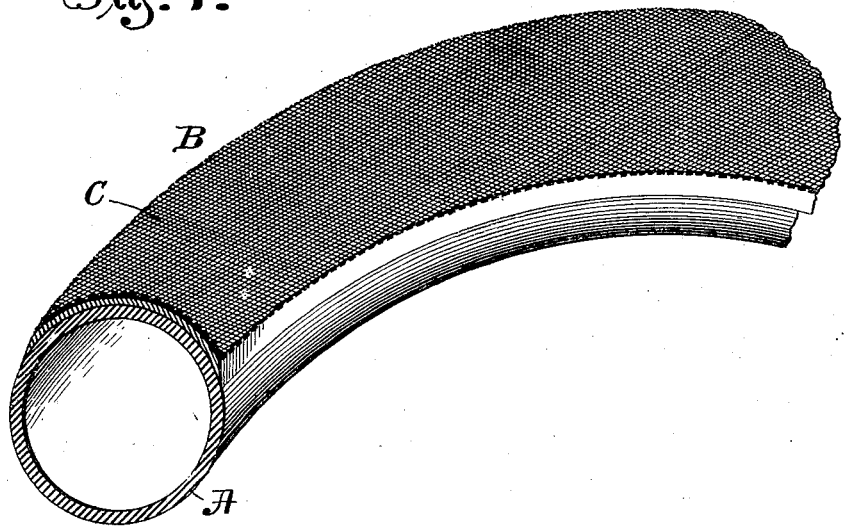
Figure 2:
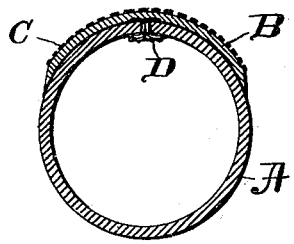

In the accompanying drawings, Figure 1 is a view showing a portion of a tire with the reinforcing-strip secured thereon, and Fig. 2 is a sectional view through the tire, a puncture with plug therein, and the reinforcing-strip.

A represents a pneumatic tire of any approved construction, and B is my improved reinforcing-strip. This is made suitably thick and wide for the purpose and is preferably smooth on its inner surface and roughened, as at 1, on its outer surface, so that cross-channels of uniform depth and disconnected and independent square projections are formed, and its edges 2 2 are beveled, so as to relieve the strip of an otherwise abrupt termination at the two outer edges. The strip when thus constructed is intended to be cemented, vulcanized, or otherwise secured entirely around the tire to be reinforced, thus affording an entirely new tread or bearing surface, and thereby adding indefinitely to the life of an otherwise nearly worn-out tire. Before applying this strip to a tire any punctures or very weak places may be first prepared by inserting a plug—for instance, one known as the "mushroom" kind—into the puncture. The outer end of this plug is spread as much as possible upon the surface of the tire, and the strip is then secured around the tread of the tire over the outer spread end of the plug or plugs, thus entirely covering them, as well as securing them permanently in place. In this way the entire tire is made uniformly strong upon its wearing-surface.

Should it ever be desired to use less than the entire encircling strip—as, for instance, for a patch—it could be done by cutting off a small portion of the strip and applying it in the same manner. However, it is the main object of my present invention to provide an entirely new tread for the tire for vehicles using pneumatic tires, and, as explained, I have provided a strip which can be easily and quickly secured upon a worn tire, so that the life of an ordinary tire is indefinitely lengthened and the expense to the user thereby greatly diminished.

It is evident that slight changes might be made in the form and arrangement of the parts described without departing from the spirit and scope of my invention, and hence I do not wish to limit myself to the precise construction herein set forth; but,

Having thus described my invention, what I claim as new, and desire to secure by Letters Patent, is—

As an article of manufacture, a reinforcing or supplemental strip of rubber adapted to be secured on a vehicle-tire, said strip having its outer surface made up of unbroken cross-channels of uniform depth and inclosed, independent or square projections whereby to prevent water and mud from being carried around on the surface when the wheel turns at a moderate speed.

NILS SWANSON.

In presence of—
WILLIAM V. SMITH,
JOHN H. RYAN.